United States Patent
Warszawski et al.

(10) Patent No.: US 9,436,489 B2
(45) Date of Patent: Sep. 6, 2016

(54) VIRTUAL MACHINE DATA REPLICATION WITH SHARED RESOURCES

(71) Applicant: Red Hat Israel, Ltd., Raanana (IL)

(72) Inventors: Eduardo Warszawski, Kfar Saba (IL); Yeela Kaplan, Tel Aviv (IL)

(73) Assignee: Red Hat Israel, Ltd., Raanana (IL)

(*) Notice: Subject to any disclaimer, the term of this patent is extended or adjusted under 35 U.S.C. 154(b) by 235 days.

(21) Appl. No.: 14/136,098

(22) Filed: Dec. 20, 2013

(65) Prior Publication Data

US 2015/0178106 A1    Jun. 25, 2015

(51) Int. Cl.
*G06F 9/455* (2006.01)

(52) U.S. Cl.
CPC .................. *G06F 9/45533* (2013.01)

(58) Field of Classification Search
None
See application file for complete search history.

(56) References Cited

U.S. PATENT DOCUMENTS

| | | | |
|---|---|---|---|
| 8,135,930 B1 | 3/2012 | Mattox et al. | |
| 8,381,211 B2 | 2/2013 | Ashok et al. | |
| 8,886,865 B1* | 11/2014 | Huang | G06F 3/0665 711/6 |
| 2009/0204961 A1* | 8/2009 | DeHaan | G06F 8/60 718/1 |
| 2009/0292737 A1* | 11/2009 | Hayton | G06F 8/68 |
| 2012/0290630 A1 | 11/2012 | Aizman et al. | |
| 2012/0324183 A1 | 12/2012 | Chiruvolu et al. | |
| 2013/0185716 A1 | 7/2013 | Yin et al. | |
| 2014/0109089 A1* | 4/2014 | Zhang | G06F 8/65 718/1 |
| 2014/0359213 A1* | 12/2014 | Messec | G06F 3/0665 711/114 |

OTHER PUBLICATIONS

Petrovic, D., et al., "Implementing Virtual Machine Replication: A Case Study Using Xen and KVM", Mar. 26-29, 2012.
Nicolae, Bogdan, et al., "Going Back and Forth: Efficient Multideployment and Multisnapshotting on Clouds", INRIA-00570682, version 1, Mar. 23, 2011.
VMWare vShpere, 2013.
Gsoedl, Jacob, "Backing up VMs: Traditional Apps vs. Virtual Machine Backup Software", 2011.
Sanda, Sasha, "Hyper-V Replica Server", Oct. 5, 2012.

* cited by examiner

*Primary Examiner* — Emerson Puente
*Assistant Examiner* — Steven Do
(74) *Attorney, Agent, or Firm* — Lowenstein Sandler LLP

(57) ABSTRACT

Systems and methods for virtual machine data replication with shared resources. An example method may include: identifying resources that are shared across a plurality of virtual machines, storing a copy of the resources, receiving, an indication of a portion of virtual storage of a virtual machine to be replicated, determining that the portion of virtual storage is not included in the resources, in response to the determination, updating a replicated copy of the virtual machine in view of the portion of virtual storage, the replicated copy further including the resources that are shared across a plurality of virtual machines, determining an initialization efficiency metric in relation to the replicated copy, and in response to the determination that the initialization efficiency metric exceeds an efficiency threshold, storing a copy of the virtual storage.

20 Claims, 3 Drawing Sheets

VIRTUAL MACHINE DATA REPLICATION WITH SHARED RESOURCES

TECHNICAL FIELD

Implementations of the present disclosure relate to a computing system, and more specifically, to virtual machine data replication with shared resources.

BACKGROUND

Virtualization entails running programs, usually multiple operating systems, concurrently and in isolation from other programs on a single system. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. A hypervisor may save a state of a virtual machine at a reference point in time, which is often referred to as a snapshot. The snapshot can be used to restore or rollback the virtual machine to the state that was saved at the reference point in time.

DESCRIPTION OF DRAWINGS

The details of one or more implementations are set forth in the accompanying drawings and the description below. Other features and advantages will be apparent from the description and drawings, and from the claims.

DETAILED DESCRIPTION

Figure 1:
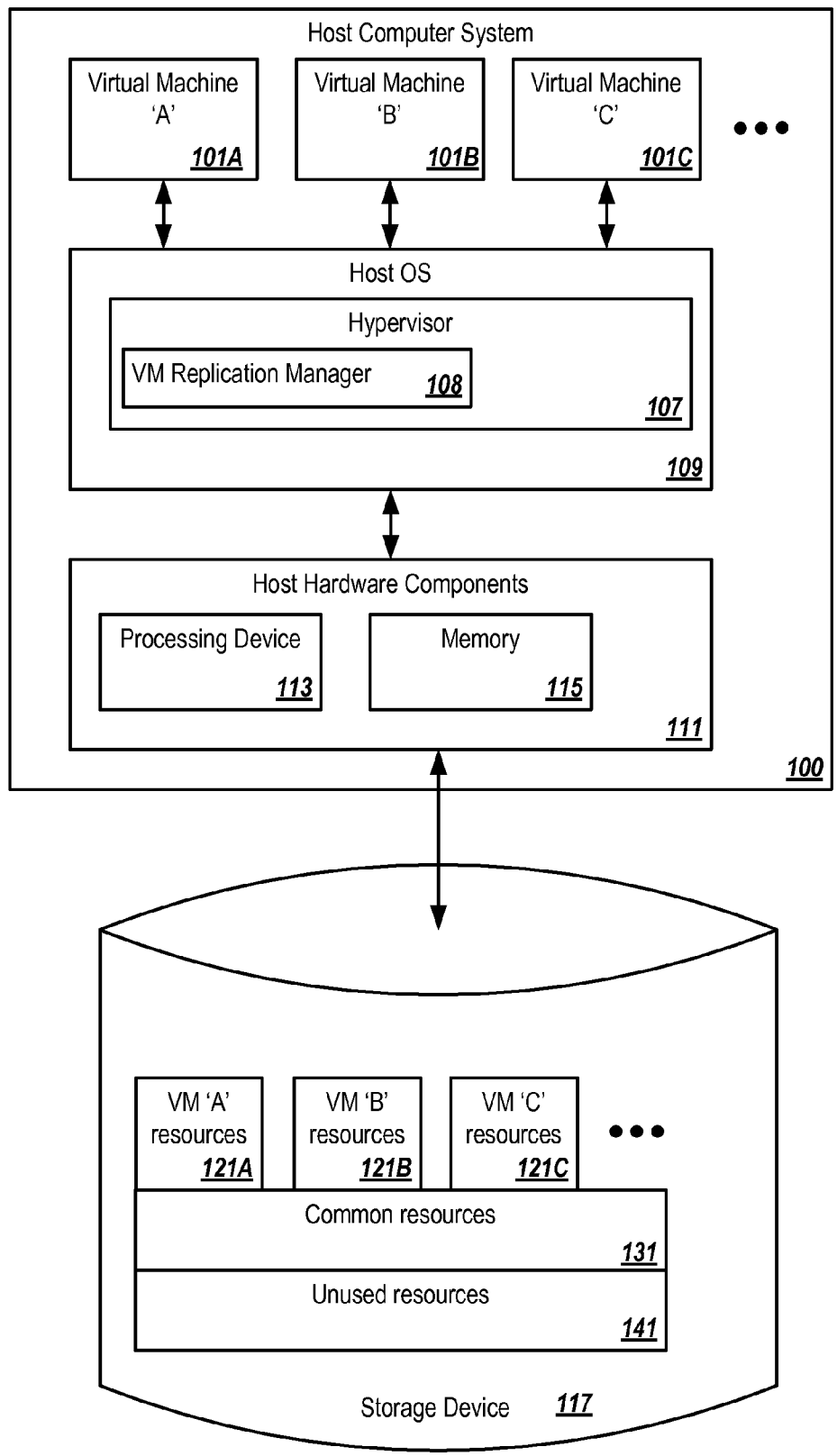
FIG. 1 is a block diagram of a host computer system in accordance with some implementations.

In order to virtualize storage (e.g., with respect to one or more virtual machines (VMs)), many techniques simply replicate an entire disk 'block-by-block,' including the disk images of multiple VMs, despite the fact that not all of the VMs being replicated may be running at the same time. This approach is inefficient as the portions of storage that are used by the VMs that are not running (e.g., at the time of replication) remain unchanged. As a result, all stored data is replicated (even blocks that are empty or contain data which is redundant/unchanged), entailing considerable processing overhead in order to replicate the redundant data, as well as storage overhead in order to maintain multiple copies of the same data when replicated.

Additionally, in many scenarios, such as those in which multiple VMs are run having the same (or similar) guest operating systems (OS), a considerable portion of the data used by each of the respective VMs (e.g., OS system files) is the same, and only a relatively small portion of data is different from one VM to another.

In order to increase the efficiency of such replication operations, described herein are various technologies that pertain to virtual machine data replication with shared resources. That is, rather than replicating VM data in a 'block-by-block' fashion (which results in considerable redundancies and inefficiencies), resources that are shared across multiple VMs (e.g., system files that are common to multiple VMs, unused space, etc.) can be identified, and can be stored as a single instance which is associated with each VM. Prior to initiating a replication operation, such shared resources can be consulted, in order to determine whether data from a particular VM needs to be replicated (or whether it is already included in the shared resources). Upon determining that data from a particular VM is not included in the shared resources, the data can be replicated. In doing so, a copy of all of the stored resources of a particular VM can be maintained, while only replicating those portions of the storage of the VM that are unique to the VM, thereby avoiding the unnecessary replication of resources that have been previously stored (e.g., with respect to other VMs).

Additionally, while considerable efficiencies (e.g., storage and/or processing efficiencies) can be realized though the replication of those portions of the storage of various VMs that are unique to each respective VM and the association of such resources with a single instance of resources that are shared across several VMs, in some scenarios such approaches/techniques can also entail certain inefficiencies. For example, it can be appreciated that by storing the unique resources of a particular VM in association with resources that are shared across several VMs (e.g., in one or more files that are separate from the shared resources), it can be relatively less efficient to reinitialize a VM from such an arrangement (in contrast to a single disk image, for example). Accordingly, upon determining that it may be too inefficient (e.g., with respect to time and/or processing resources) to initialize a new virtual machine using unique resources that are associated with a single copy of shared resources, a copy of the entirety of the virtual storage of a VM (including shared resources) can be stored in addition to or in lieu of the replicated copy (which associates unique resources of the VM with resources shared with other VMs). In doing so, a balance can be drawn between minimizing the storage of redundant resources (e.g., by storing unique resources in association with a single copy of shared resources) and time/processing efficiencies associated with initializing new VMs (such as by storing a copy of the entire virtual storage in scenarios where associating unique and shared resources may be too time/resource inefficient).

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

For brevity, simplicity and by way of example, a hypervisor performs many of the operations described herein. It is contemplated that other actors may perform some or all of the operations described herein, including a host operating system, multiple hypervisors, a VM replication manager, and the like, including a combination thereof.

FIG. 1 is a block diagram that illustrates an example of a host computer system 100 that hosts one or more VMs 101A-C (e.g., virtual machine 'A,' etc.). Each VM can run a guest operating system (OS). The VMs may have the same or different guest operating systems, such as Microsoft Windows®, Linux®, Solaris®, Mac® OS, etc. The host computer system 100 may be a server, a workstation, a personal computer (PC), a mobile phone, a palm-sized computing device, a personal digital assistant (PDA), etc.

The host computer system 100 runs a hypervisor 107 to virtualize access to the underlying host hardware, making the use of the VM transparent to the guest OS and a user of the host computer system 100. The hypervisor 107 may also be known as a virtual machine monitor (VMM) or a kernel-based hypervisor. The hypervisor 107 may be part of a host OS 109 (as shown in FIG. 1), run on top of the host OS 109, or run directly on the host hardware without an operating system beneath it (i.e., bare metal). The host OS 109 can be the same OS as the guest OS, or can be a different OS. The hypervisor 107 can include a VM replication manager 108 that handles VM disk replication.

The host computer system 100 includes hardware components 111 such as one or more physical processing devices (e.g., central processing units (CPUs)) 113, memory 115 (also referred to as "host memory" or "physical memory") and other hardware components. In one implementation, the host computer system 100 includes one or more physical devices (not shown), which can be audio/video devices (e.g., video cards, sounds cards), network interface devices, printers, graphics modules, graphics devices, system components (e.g., PCI devices, bridges, ports, buses), etc. It is understood that the host computer system 100 may include any number of devices.

The host computer system 100 may also be coupled to one or more storage devices 117 via a direct connection or a network. The storage device 117 may be an internal storage device or an external storage device. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS)), and so forth.

The storage device 117 may store one or more files, such as VM resources 121A-C (e.g., VM 'A' resources, etc.). Such VM resources 121A-C can reflect and/or include a respective disk image (and/or portions thereof) (which can include files and/or block devices, and or combinations thereof) of a corresponding VM 101A-C. Such disk images and/or portions thereof can represent data on a hard disk and can be in any format, such as a portable binary image (e.g., raw), copy-on-write (e.g., cow), compressed loop (e.g., cloop), Quick EMUlator (QEMU) copy-on-write format (e.g., qcow, qcow2), and others, such as vmdk, vdi, etc. In certain implementations, each disk image and/or portions thereof may be a single file, set of files or sequence of data (e.g., a contiguous or non-contiguous set of blocks in a block device) that contains the contents and structure representing a storage device such as a hard drive. It should be understood that when the host computer system 100 is attached to multiple storage devices 117, some files may be stored on one storage device, while other files may be stored on another storage device.

In certain implementations, storage device 117 can also store additional items or resources such as common resources 131. Common resources 131 can include one or more resources (e.g., files, etc.) that are common across multiple VMs (e.g., VMs 101A-C). That is, it can be appreciated that while certain files may differ from VM to VM, other files (e.g., operating system files, in a scenario where two VMs run the same guest operating system) may be the same across multiple VMs. Accordingly, as described herein, in lieu of storing a separate set of such common resources for each VM that is replicated, a single set of common resources can be stored and shared across each of the VMs that share such files (e.g., VMs 101A-C).

Moreover, in certain implementations storage device 117 can also store or otherwise allocate space for resources such as unused resources 141, such as unused or empty disk space. That is, it can be appreciated that while each VM may be allocated with a certain amount of virtual disk space/capacity, some portion of the allocated space for each VM is likely to remain unused. Accordingly, as described herein, in lieu of storing and maintaining a separate set of such unused resources for each VM that is replicated, a single set of unused resources can be maintained and shared across each of the VMs (e.g., VMs 101A-C). This unused space can also be dynamically allocated, as needed to each respective VM.

Figure 2:
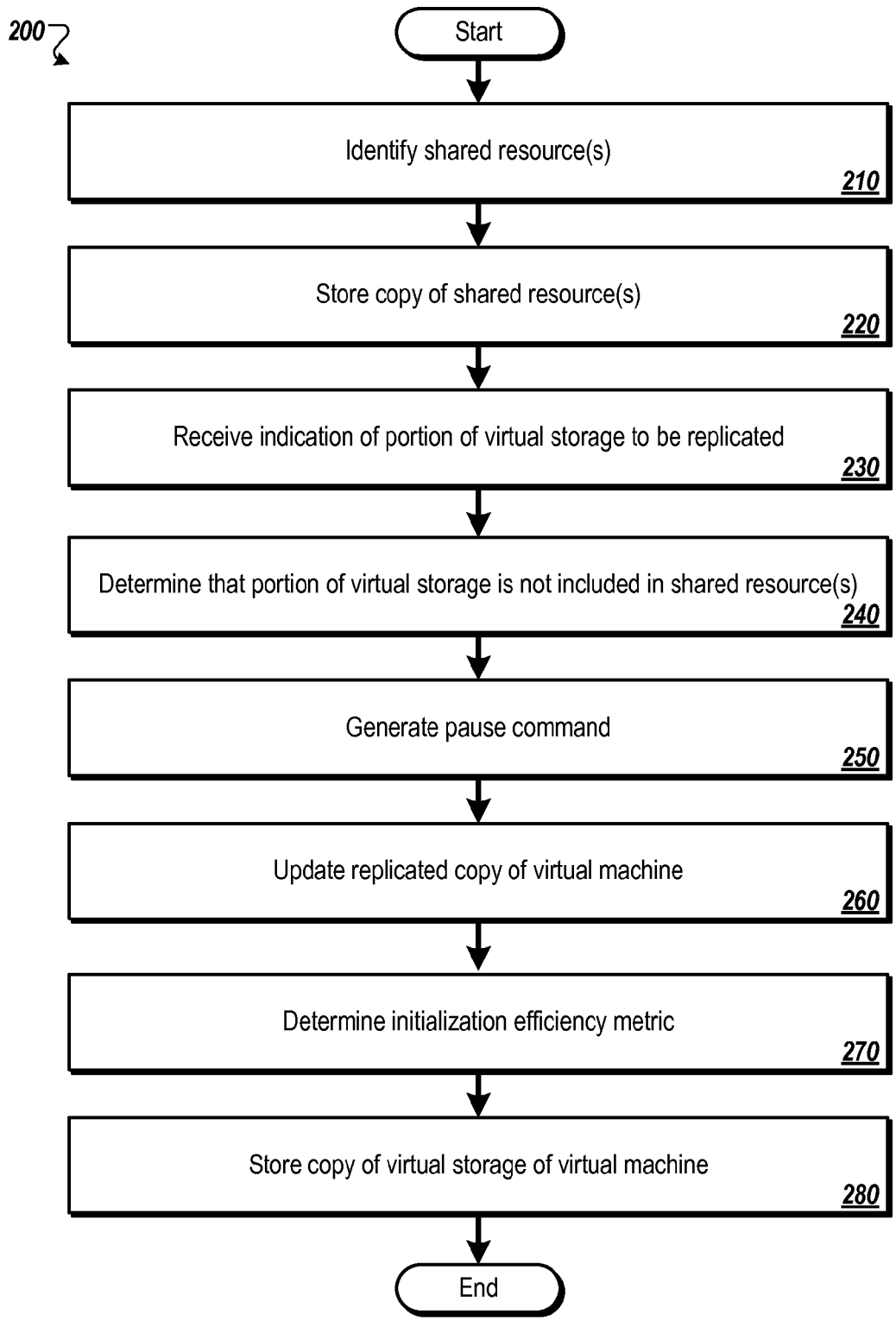
FIG. 2 is a flow diagram of a method for virtual machine data replication with shared resources in accordance with some implementations.

FIG. 2 is a flow diagram of a method 200 for virtual machine data replication with shared resources in accordance with some implementations. Method 200 can be performed by processing logic (e.g., in computing system 300 of FIG. 3) that may comprise hardware (e.g., circuitry, dedicated logic, programmable logic, microcode, etc.), software (such as instructions run on a processing device), firmware, or a combination thereof. In one implementation, method 200 is performed by hypervisor 107 and/or VM replication manager 108 of FIG. 1. For clarity of presentation, the description that follows uses the system 100 as examples for describing the method 200. However, another system, or combination of systems, may be used to perform the method 200.

At block 210, one or more resources that are shared across a plurality of virtual machines can be identified. For example, VM replication manager 108 and/or hypervisor 107 can identify one or more resources that are common several virtual machines. By way of illustration, as depicted in FIG. 1, it can be determined that VMs 101A-C (which can, for example, be running the same guest operating system) share several common resources, and these common resources (e.g., system files, etc.) can be identified. By way of further example, such shared resources can include one or more unused resources, such as empty disk space. By way of illustration, as depicted in FIG. 1, it can be determined that VMs 101A-C (each of which can, for example, be running a different operating system) each have some amount of empty or unused disk space, and such unused space can be identified.

At block 220, a copy of one or more resources (such as those identified at block 210) can be stored. That is, having identified various resources (e.g., common resources, unused resources, etc.) that are shared across several virtual machines, VM replication manager 108 and/or hypervisor 107 can store a copy of such resources (e.g., at storage device 117). It should be understood that, as described herein, a single copy of such resources can be stored and/or otherwise maintained, and these resources can be further associated with resources that pertain to individual virtual machines (e.g., VM 101A, VM 101B, etc.) in order to minimize the amount of storage space dedicated to resources that are otherwise constant across multiple virtual machines.

At block 230, an indication of a portion of virtual storage of a virtual machine to be replicated can be received. It should be understood that any number of factors, occurrences, situations, etc., can trigger such an indication. For example, in certain scenarios such an indication (e.g., a notification, message, etc. to replicate some or all of the storage of a particular VM) can be provided (and thus received) at periodic intervals (e.g., every hour, every day, etc.), and thus, such an indication may not reflect that any actual changes have occurred with respect to the storage of the VM. Alternatively, in certain implementations, such an indication can include and/or otherwise reflect that one or more modifications to a portion of virtual storage of a particular virtual machine have occurred. Moreover, in certain implementations such an indication can include and/or otherwise reflect that a new portion of virtual storage has been created for a particular virtual machine. For example, when an existing file is modified and/or when a new file is created in a particular VM (e.g., VM 101A), the VM can provide an indication of such a change to VM replication manager 108 and/or hypervisor 107. Alternatively, VM replication manager 108 and/or hypervisor 107 can be configured to monitor each VM 101A-C for such indications, which reflect that changes have occurred to data in the particular VM.

At block 240, it can be determined that a portion of virtual storage of the one of the virtual machines (such as the portion of virtual storage with respect to which the indication was received at block 230) is not included in the one or more resources (such as the one or more resources identified at block 210 and/or copied at block 220). That is, having received an indication (e.g., at block 230) from a particular VM reflecting that part (or all) of the storage of that VM is to be replicated, a determination can be made (e.g., by VM replication manager 108 and/or hypervisor 107) as to whether or not the portion of the storage associated with the received indication is already included within the shared resources (e.g., common resources 131 or unused resources 141) that have been previously stored and are associated with the VM. If it is determined that the received indication corresponds to data already included within such shared resources, the process can conclude without further replication (thereby increasing the efficiency of the system by avoiding further replication where such operations are unnecessary). However, if it is determined that the received indication corresponds to data that is not included within such shared resources, further operations can be performed as described herein.

At block 250, a pause command can be generated. In certain implementations, such a pause command can be generated with respect to a virtual machine, such as the virtual machine with respect to which an indication of a portion of virtual storage of to be replicated was received (e.g., at block 230). That is, having determined (e.g., at block 240) that a portion of the data/storage of a particular VM is not included within various shared resources (and thus is to be replicated), a pause command can be generated and/or otherwise initiated/implemented with respect to the particular VM. Such a pause command can temporarily stop the operation of the particular VM in order to enable various replication operations to be completed in a more efficient and/or expedient manner (and also maintain consistency). It should be noted that while such pause commands may be inconvenient and/or intrusive in certain circumstances, by minimizing the amount of data/storage that is to be replicated (by avoiding further replication resources that are shared across multiple VMs), the total number of replication instances as well as the overall processing volume of such replication operations can be reduced considerably, resulting in relatively infrequent VM pauses and/or other such interruptions.

At block 260, a replicated copy of a virtual machine can be updated. In certain implementations, such a replicated copy can be updated in response to/based on a determination that the portion of virtual storage of the virtual machine is not included in the one or more resources (such as can be determined at block 240). Moreover, in certain implementations such a replicated copy of a virtual machine can be updated based on/in view of the portion of virtual storage of the virtual machine (such as the portion of virtual storage with respect to which the indication was received at block 230). That is, having determined that data/storage from a particular virtual machine (e.g., VM 101B, as shown in FIG. 1) is not included among various shared resources (e.g., common resources 131, unused resources 141) and should thus be replicated, the portion of the data/storage of the particular VM can be copied (e.g., by VM replication manager 108 and/or hypervisor 107) and used to update a replicated copy of the virtual machine (e.g., VM 'B' resources 121B, as shown in FIG. 1). Such a replicated copy of the virtual machine can include both resources that the particular VM shares with other VMs (e.g., common resources 131, unused resources 141), as well as those resources that are unique to the particular VM (e.g., VM resources 121B). In doing so, a copy of all of the stored resources of a particular VM can be maintained, while only replicating those portions of the storage of the VM that are unique to the VM, thereby avoiding the unnecessary replication of resources that have been previously stored (e.g., with respect to other VMs).

At block 270, an initialization efficiency metric can be determined. In certain implementations, such a metric can be determined in relation to a replicated copy of a virtual machine (such as the replicated copy of a virtual machine updated at block 260). That is, being that the replicated copy of the virtual machine associates resources that are unique to the particular VM with other resources that the particular VM shares with other VMs, initializing a new VM using such a replicated copy may entail additional processing overhead and/or delays (on account of the fact that, for example, the unique resources and the shared resources, though associated with one another, may be stored separately, in separate physical locations/blocks, etc.). Accordingly, having updated the replicated copy of a virtual machine (e.g., at block 260), such an updated replicated copy can be processed (e.g., by analyzing one or more factors and/or aspects of the replicated copy) in order to determine an initialization efficiency metric with respect to the updated replicated copy. In certain implementations, such an initialization efficiency metric can be determined (e.g., by VM replication manager 108 and/or hypervisor 107) by simulating the initialization of a virtual machine based on the updated replicated copy and/or by analyzing one or more aspects of the updated replicated copy (e.g., aspects of the unique resources included in the replicated copy as they relate to the shared resources in the replicated copy, such as the degree to which such unique resources are linked to and/or utilize aspects of the shared resources, as such factors may entail additional processing requirements and/or delays when initializing a virtual machine). Moreover, in certain implementations such an initialization efficiency metric can reflect an amount of time (e.g., in milliseconds, seconds, etc.) and/or processing power (and/or any other resource overhead) that initializing a new VM based on the updated replicated copy is likely to entail.

At block 280, a copy of the virtual storage of the virtual machine can be stored. In certain implementations, such a copy of the virtual storage can be stored in response to a determination (such as at block 270) that the initialization efficiency metric of the replicated copy of the virtual machines exceeds a defined efficiency threshold. Such an efficiency threshold can define, for example, a limit with respect to time and/or processing power (and/or any other such resource) that initializing a VM (e.g., using an updated replicated copy) is not to exceed. Accordingly, having determined that the initialization efficiency metric of a replicated copy of a virtual machine exceeds such a threshold, a copy of the virtual storage (e.g., a copy of the entirety of the virtual storage, including shared resources) can be stored. In certain implementations, such a copy can be stored in addition to or in lieu of the replicated copy (such as that updated at block 260). In doing so, a balance can be drawn between minimizing the storage of redundant resources (such as by storing unique resources in association with a single copy of shared resources) and time/processing efficiencies associated with initializing new VMs (such as by storing a copy of the entire virtual storage in scenarios where associating unique and shared resources may be too time/resource inefficient).

Figure 3:
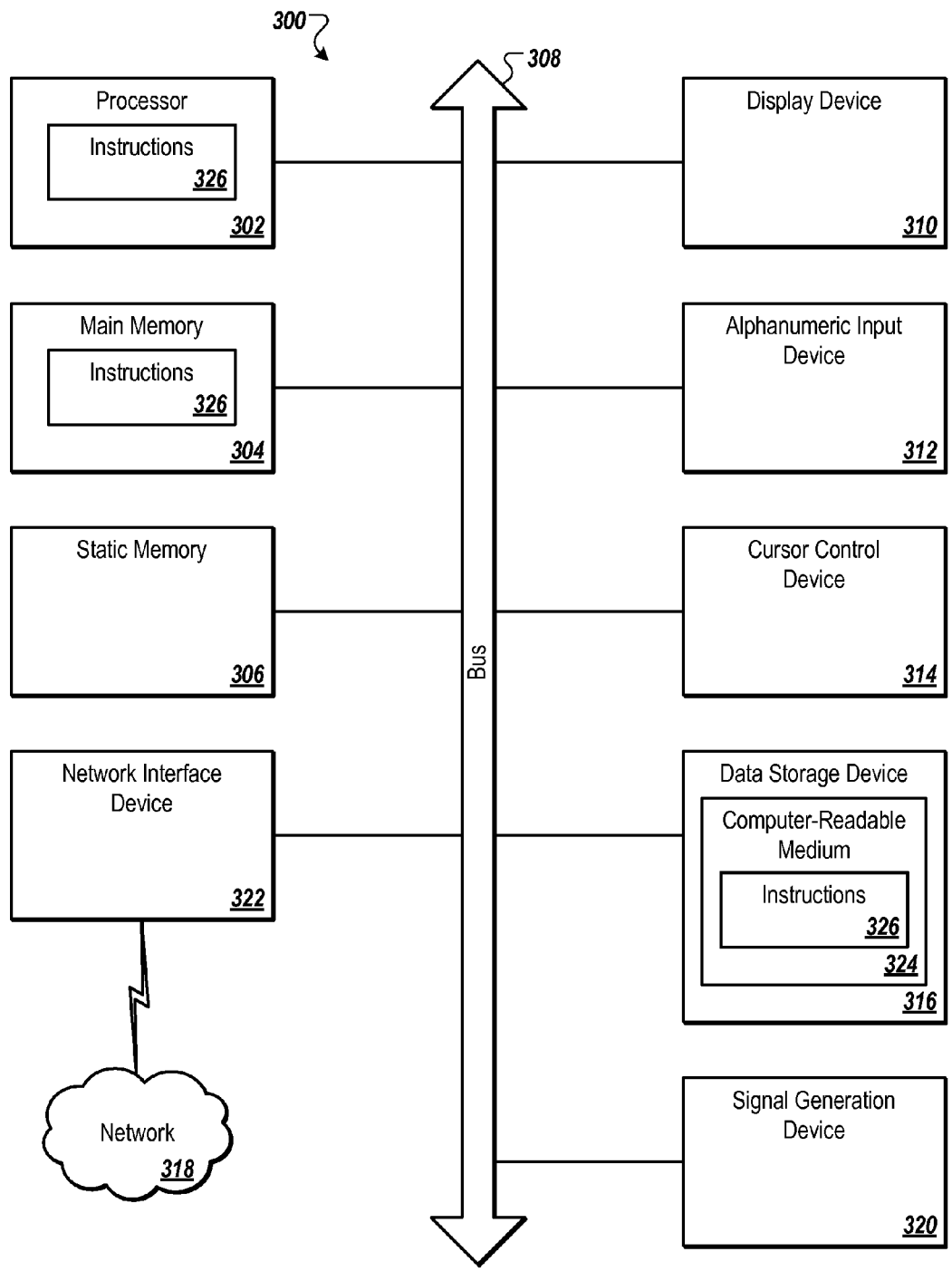
FIG. 3 is a schematic diagram that shows an example of a machine in the form of a computer system.

FIG. 3 is a schematic diagram that shows an example of a machine in the form of a computer system 300. The computer system 300 executes one or more sets of instructions 326 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 326 to perform any one or more of the methodologies discussed herein.

The computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 316, which communicate with each other via a bus 308.

The processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, system on chip (SoC) or the like. The processor 302 is configured to execute instructions of the host computer system 100 for performing the operations and steps discussed herein.

The computer system 300 may further include a network interface device 322 that provides communication with other machines over a network 318, such as a local area network (LAN), an intranet, an extranet, or the Internet. The computer system 300 also may include a display device 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable storage medium 324 on which is stored the sets of instructions 326 of the host computer system 100 embodying any one or more of the methodologies or functions described herein. The sets of instructions 326 of the host computer system 100 may also reside, completely or at least partially, within the main memory 304 and/or within the processor 302 during execution thereof by the computer system 300, the main memory 304 and the processor 302 also constituting computer-readable storage media. The sets of instructions 326 may further be transmitted or received over the network 318 via the network interface device 322.

While the example of the computer-readable storage medium 324 is shown as a single medium, the term "computer-readable storage medium" can include a single medium or multiple media (e.g., a centralized or distributed database, and/or associated caches and servers) that store the sets of instructions 326. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "storing", "receiving", "determining", "updating", "pausing", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying one or more resources that are shared across a plurality of virtual machines; storing a copy of each of the one or more resources;
   receiving, from one of the plurality of virtual machines, an indication of a portion of a virtual storage of the one of the plurality of virtual machines to be replicated;
   determining, by a processing device, that the portion of the virtual storage of the one of the plurality of virtual machines is not included in the one or more resources;
   in response to a determination that the portion of the virtual storage of the one of the plurality of virtual machines is not included in the one or more resources, updating a replicated copy of the one of the plurality of virtual machines in view of the portion of the virtual storage of the one of the plurality of virtual machines, the replicated copy of the one of the plurality of virtual machines further comprising the one or more resources that are shared across a plurality of virtual machines;
   determining an initialization efficiency metric in relation to the replicated copy of the one of the plurality of virtual machines, wherein the initialization efficiency metric reflects at least one of:
      an amount of time that initializing a new virtual machine in view of the replicated copy is likely to entail,
      an amount of processing power that initializing a new virtual machine in view of the replicated copy is likely to entail, or
      a resource overhead that initializing a new virtual machine in view of the replicated copy is likely to entail; and
   in response to a determination that the initialization efficiency metric of the replicated copy of the one of the plurality of virtual machines exceeds a defined efficiency threshold, storing a copy of the virtual storage of the one of the plurality of virtual machines, the copy of the virtual storage comprising the one or more resources that are shared across the plurality of virtual machines.

2. The method of claim 1, wherein the one or more resources comprise one or more resources that are common to the one of the plurality of virtual machines and the plurality of virtual machines.

3. The method of claim 1, wherein the one or more resources comprise one or more unused resources.

4. The method of claim 1, further comprising generating a pause command with respect to the one of the plurality of virtual machines.

5. The method of claim 1, wherein the indication of the portion of the virtual storage of the one of the plurality of virtual machines to be replicated comprises a modification to a portion of the virtual storage of the first virtual machine.

6. The method of claim 1, wherein the indication of the portion of the virtual storage of the one of the plurality of virtual machines to be replicated comprises a new portion of the virtual storage of the first virtual machine.

7. The method of claim 1, wherein updating a replicated copy of the one of the plurality of virtual machines comprises copying a portion of the virtual storage of the one of the plurality of virtual machines that is not present in the replicated copy of the one of the plurality of virtual machines to the replicated copy of the one of the plurality of virtual machines.

8. A system comprising:
   a memory; and
   a processing device, operatively coupled to the memory, to:
      identify one or more resources that are shared across a plurality of virtual machines;
      store a copy of each of the one or more resources;
      receive, from one of the plurality of virtual machines, an indication of a portion of a virtual storage of the one of the plurality of virtual machines to be replicated;
      determine that the portion of the virtual storage of the one of the plurality of virtual machines is not included in the one or more resources;
      in response to a determination that the portion of the virtual storage of the one of the plurality of virtual machines is not included in the one or more resources, update a replicated copy of the one of the plurality of virtual machines in view of the portion of the virtual storage of the one of the plurality of virtual machines, the replicated copy of the one of the plurality of virtual machines further comprising the one or more resources that are shared across a plurality of virtual machines;
      determine an initialization efficiency metric in relation to the replicated copy of the one of the plurality of virtual machines, wherein the initialization efficiency metric reflects at least one of:

an amount of time that an initialization of a new virtual machine in view of the replicated copy is likely to entail, an amount of processing power that an initialization of a new virtual machine in view of the replicated copy is likely to entail, or a resource overhead that an initialization of a new virtual machine in view of the replicated copy is likely to entail; and in response to a determination that the initialization efficiency metric of the replicated copy of the one of the plurality of virtual machines exceeds a defined efficiency threshold, store a copy of the virtual storage of the one of the plurality of virtual machines, the copy of the virtual storage comprising the one or more resources that are shared across the plurality of virtual machines.

9. The system of claim 8, wherein the one or more resources comprise one or more resources that are common to the one of the plurality of virtual machines and the plurality of virtual machines.

10. The system of claim 8, wherein the one or more resources comprise one or more unused resources.

11. The system of claim 8, wherein the processing device is further to generate a pause command with respect to the one of the plurality of virtual machines.

12. The system of claim 8, wherein the indication of the portion of the virtual storage of the one of the plurality of virtual machines to be replicated comprises a modification to a portion of the virtual storage of the first virtual machine.

13. The system of claim 8, wherein the indication of the portion of the virtual storage of the one of the plurality of virtual machines to be replicated comprises a new portion of the virtual storage of the first virtual machine.

14. The system of claim 8, wherein to update a replicated copy of the one of the plurality of virtual machines, the processing device is further to copy a portion of the virtual storage of the one of the plurality of virtual machines that is not present in the replicated copy of the one of the plurality of virtual machines to the replicated copy of the one of the plurality of virtual machines.

15. A non-transitory computer-readable storage medium having instructions that, when executed by a processing device, cause the processing device to:

identify one or more resources that are shared across a plurality of virtual machines;

store a copy of each of the one or more resources;

receive, from one of the plurality of virtual machines, an indication of a portion of virtual storage of the one of the plurality of virtual machines to be replicated;

determine that the portion of the virtual storage of the one of the plurality of virtual machines is not included in the one or more resources;

in response to a determination that the portion of the virtual storage of the one of the plurality of virtual machines is not included in the one or more resources, update, by the processing device, a replicated copy of the one of the plurality of virtual machines in view of the portion of the virtual storage of the one of the plurality of virtual machines, the replicated copy of the one of the plurality of virtual machines further comprising the one or more resources that are shared across a plurality of virtual machines;

determine an initialization efficiency metric in relation to the replicated copy of the one of the plurality of virtual machines, wherein the initialization efficiency metric reflects at least one of:

an amount of time that an initialization of a new virtual machine in view of the replicated copy is likely to entail, an amount of processing power that an initialization of a new virtual machine in view of the replicated copy is likely to entail, or a resource overhead that an initialization of a new virtual machine in view of the replicated copy is likely to entail; and in response to a determination that the initialization efficiency metric of the replicated copy of the one of the plurality of virtual machines exceeds a defined efficiency threshold, store a copy of the virtual storage of the one of the plurality of virtual machines, the copy of the virtual storage comprising the one or more resources that are shared across the plurality of virtual machines.

16. The non-transitory computer-readable storage medium of claim 15, wherein the one or more resources comprise one or more resources that are common to the one of the plurality of virtual machines and the plurality of virtual machines.

17. The non-transitory computer-readable storage medium of claim 15, wherein the processing device is further to generate a pause command with respect to the one of the plurality of virtual machines.

18. The non-transitory computer-readable storage medium of claim 15, wherein the indication of the portion of the virtual storage of the one of the plurality of virtual machines to be replicated comprises a modification to a portion of the virtual storage of the first virtual machine.

19. The non-transitory computer-readable storage medium of claim 15, wherein the indication of the portion of the virtual storage of the one of the plurality of virtual machines to be replicated comprises a new portion of virtual storage of the first virtual machine.

20. The non-transitory computer-readable storage medium of claim 15, wherein to update a replicated copy of the one of the plurality of virtual machines the processing device is further to copy a portion of the virtual storage of the one of the plurality of virtual machines that is not present in the replicated copy of the one of the plurality of virtual machines to the replicated copy of the one of the plurality of virtual machines.

* * * * *